(12) United States Patent
Maalej et al.

(10) Patent No.: US 6,545,532 B1
(45) Date of Patent: Apr. 8, 2003

(54) TIMING RECOVERY CIRCUIT IN A QAM DEMODULATOR

(75) Inventors: Khaled Maalej, Paris (FR); Emmanuel Hamman, Paris (FR); Amaury Demol, Paris (FR); Yannick Levy, Paris (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 09/550,883

(22) Filed: Apr. 17, 2000

Related U.S. Application Data

(63) Continuation-in-part of application No. 09/396,555, filed on Sep. 8, 1999, now Pat. No. 6,160,443.

(51) Int. Cl.[7] .................................................. H04L 7/00
(52) U.S. Cl. ........................ 329/304; 329/306; 375/219; 375/222; 375/324; 375/325; 375/327; 375/329; 375/355; 375/362
(58) Field of Search ............................... 329/304, 306; 375/326, 325, 329, 345, 362, 222, 219, 355, 324, 327

(56) References Cited

U.S. PATENT DOCUMENTS

| | | | |
|---|---|---|---|
| 5,278,865 A | * 1/1994 | Amrany et al. | 375/222 |
| 5,309,484 A | 5/1994 | McLane et al. | 375/354 |
| 5,572,558 A | 11/1996 | Beherns | 375/376 |
| 5,694,079 A | 12/1997 | Allpress et al. | 329/327 |
| 5,943,369 A | * 8/1999 | Knutson et al. | 375/326 |
| 6,128,357 A | * 10/2000 | Lu et al. | 375/355 |
| 6,295,325 B1 | * 9/2001 | Farrow et al. | 375/327 |

OTHER PUBLICATIONS

F. M. Gardner, "Interpolation in Digital Modems—Part I: Fundamentals", IEEE Transactions on Communications, vol. 41, No. 3, Mar. 1993, pp. 501–507.

F. M. Gardner, "Interpolation in Digital Modems—Part II: Implementation and Performance", IEEE Transactions on Communications, vol. 41, No. 6, Jun. 1993, pp. 998–1008.

* cited by examiner

*Primary Examiner*—Arnold Kinkead
(74) *Attorney, Agent, or Firm*—Thomas Schneck

(57) ABSTRACT

A timing recovery circuit in a QAM demodulator which uses a symbol rate continuously adaptive interpolation filter. The method of interpolation used in the present invention is defined as a function of time per interpolation interval, rather than as a function of time per sampling interval as is commonly implemented in the prior art. This allows the interpolation filtering to be totally independent of the symbol rate in terms of complexity and performance and provides a better rejection of adjacent channels, since the interpolator rejects most of the signal outside the bandwidth of the received channel.

18 Claims, 7 Drawing Sheets

TIMING RECOVERY CIRCUIT IN A QAM DEMODULATOR

CROSS REFERENCE TO RELATED APPLICATION

This application is a continuation-in-part of U.S. patent application Ser. No. 09/396,555, filed Sep. 8, 1999 now U.S. Pat. No. 6,160,443.

TECHNICAL FIELD

The present invention relates to a quadrature amplitude modulation (QAM) type demodulator for demodulating signals modulated in accordance with the QAM scheme.

BACKGROUND ART

Quadrature amplitude modulation (QAM) is an intermediate frequency (IF) modulation scheme in which a QAM signal is produced by amplitude modulating two baseband signals, generated independently of each other, with two quadrature carriers, respectively, and adding the resulting signals. The QAM modulation is used to modulate a digital information into a convenient frequency band. This may be to match the spectral band occupied by a signal to the passband of a transmission line, to allow frequency division multiplexing of signals, or to enable signals to be radiated by smaller antennas. QAM has been adopted by the Digital Video Broadcasting (DVB) and Digital Audio Visual Council (DAVIC) and the Multimedia Cable Network System (MCNS) standardization bodies for the transmission of digital TV signals over Coaxial, Hybrid Fiber Coaxial (HFC), and Microwave Multi-port Distribution Wireless Systems (MMDS) TV networks.

The QAM modulation scheme exists with a variable number of levels (4, 16, 32, 64, 128, 256, 512, 1024) which provide 2, 4, 5, 6, 7, 8, 9, and 10 Mbit/s/MHz. This offers up to about 42 Mbit/s (QAM-256) over an American 6 MHz CATV channel, and 56 Mbit/s over an 8 MHz European CATV channel. This represents the equivalent of 10 PAL or SECAM TV channels transmitted over the equivalent bandwidth of a single analog TV program, and approximately 2 to 3 High Definition Television (HDTV) programs. Audio and video streams are digitally encoded and mapped into MPEG2 transport stream packets, consisting of 188 bytes.

The bit stream is decomposed into n bits packets. Each packet is mapped into a QAM symbol represented by two components I and Q, (e.g., n=4 bits are mapped into one 16-QAM symbol, n=8 bits are mapped into one 256-QAM symbol). The I and Q components are filtered and modulated using a sine and a cosine wave (carrier) leading to a unique Radio Frequency (RF) spectrum. The I and Q components are usually represented as a constellation which represents the possible discrete values taken over in-phase and quadrature coordinates. The transmitted signal s(t) is given by:

$$s(t) = I \cos(2\pi f_0 t) - Q \sin(2\pi f_0 t),$$

where $f_0$ is the center frequency of the RF signal. I and Q components are usually filtered waveforms using raised cosine filtering at the transmitter and the receiver. Thus, the resulting RF spectrum is centered around $f_0$ and has a bandwidth of $R(1+\alpha)$, where R is the symbol transmission rate and $\alpha$ is the roll-off factor of the raised cosine filter. The symbol transmission rate is $1/n^{th}$ of the transmission bit rate, since n bits are mapped to one QAM symbol per time unit 1/R.

In order to recover the baseband signals from the modulated carrier, a demodulator is used at the receiving end of the transmission line. The receiver must control the gain of the input amplifier that receives the signal, recover the symbol frequency of the signal, and recover the carrier frequency of the RF signal. After these main functions, a point is received in the I/Q constellation which is the sum of the transmitted QAM symbol and noise that was added over the transmission. The receiver then carries out a threshold decision based on lines situated at half the distance between QAM symbols in order to decide on the most probable sent QAM symbol. From this symbol, the bits are unmapped using the same mapping as in the modulator. Usually, the bits then go through a forward error decoder which corrects possible erroneous decisions on the actual transmitted QAM symbol. The forward error decoder usually contains a de-interleaver whose role is to spread out errors that could have happened in bursts and would have otherwise have been more difficult to correct.

Generally, in a data receiver, the timing must be synchronized to the symbols of the incoming data signal. In analog-implemented systems, synchronization is typically performed by altering the phase of a local clock or by regenerating a timing wave from the incoming signal. However, in circumstances involving digital techniques, wherein the signal is sampled, the sampling clock must remain independent of the symbol timing. In these circumstances, interpolation filtering is used to process the digital samples produced by an analog-to-digital converter.

Two related articles by F.M. Gardner [(1) F. M. Gardner, "Interpolation in Digital Modems—Part I: Fundamentals", *IEEE Transactions on Communications*, Vol. 41, No. 3, March 1993, and (2) F. M. Gardner, "Interpolation in Digital Modems—Part II: Implementation and Performance", *IEEE Transactions on Communications*, Vol. 41, No. 6, June 1993] describe a fundamental equation for interpolation. In the articles, Gardner proposes a method for interpolation control, outlines the signal-processing characteristics appropriate to an interpolator and describes implementation of the interpolation control method. As will be described in more detail in the description of the present invention, the mathematical model for interpolation with a time-continuous filter includes a fictitious digital-to-analog converter, followed by a time-continuous filter h(t), and a resampler at time $t = kT_i$. The output interpolants are represented by $$y(kT_i) = \sum_m x(mT_s) h(kT_i - mT_s) \qquad (A)$$

The value $mT_s$ represents the instants of sampling of the analog-to-digital converter. The resample-instants $t = kT_i$ are delivered by numerically controlled oscillator. The numerically controlled oscillator produces two signals at each time $mT_s$. The first signal is an overflow signal $\zeta$, which indicates that a resample instant $(t = kT_i)$ has occurred during the last $T_s$ period. The second signal is a $T_i$—fractional signal $\eta$, such that $\eta T_i$ represents the time since the last resample instant.

In the interpolation method proposed in the Gardner references, equation (A) is rearranged by introducing a fractional interval, $$\mu_k = \frac{kT_i}{T_s} - m_k$$

and a filter index $$i = \mathrm{int}\left[\frac{kT_i}{T_s}\right] - m$$

Equation (A) can then be rewritten as $$y(kT_i) = \sum_{i=I_1}^{I_2-1} x[(mk-i)T_s]h[(i+\mu k)T_s] \quad (B)$$

Then, a finite impulse response of length $(I_2-I_1+1)$ $T_s$ was chosen for h(t). With this choice, Equation (A) can be computed with a finite impulse response filter with $(I_2-I_1+1)$ taps. Each of these taps is computed as a function of fractional interval $\mu k$, which provides the result:

$$h((i+\mu k)T_s) = fi(\mu k) \quad (C)$$

As a consequence, the impulse response h(t) is a function of the variable $t/T_s$. This means that the filtering properties of the interpolator, such as the bandwidth for example, are fixed with respect to the sampling clock, and are not dependent on the useful part of the input signal x(t). Generally, for an ideal input signal x(t), the interpolated signal, y, is more attenuated for a high baud rate 1/T because then the bandwidth of the input signal is larger with respect to the interpolator bandwidth. In addition, in practical modem applications, the input signal x(t) is the sum of the useful signal $x_u(t)$, with bandwidth proportional to the transmission rate 1/T, and the residual impairment signal $X_m$, which has to be filtered and which may have a bandwidth as large as $1/T_s$. In this case, it is evident that the interpolated impairment signal $Y_m$ is much more important in cases where there is a low transmission rate 1/T, than in cases where there is a high transmission rate.

In the prior art interpolation methods, such as that described in the Gardner references, the fractional interval index is not directly output by the numerically controlled oscillator and therefore has to be computed. The Gardner reference proposes an exact formula for $\mu k$:

$$\mu k = \frac{\eta(m_k)}{W(m_k)} \quad (D)$$

and also proposes some practical approximations to implement this division. Additionally, in practical implementation with Digital Signal processors or other circuits, the computation power is not efficiently used for low transmission rates, 1/T. Therefore, as the transmission rate decreases, the processor activity and filtering performance also decreases.

It is the object of the present invention to provide a timing recovery circuit in a QAM demodulator that uses an interpolation method that is independent of the symbol rate and that rejects most of the signal outside the bandwidth of the receive channel.

It is a further object of the invention to provide a timing recovery circuit that uses an interpolation method that allows the timing and frequency response of the interpolation to be invariant with respect to the interpolants rate, and thus with respect to the transmission rate.

SUMMARY OF THE INVENTION

The above objects have been achieved by a timing recovery circuit in a QAM demodulator which uses a symbol rate continuously adaptive interpolation filter. As opposed to prior art methods of interpolation which use interpolation functions which are defined as a function of $t/T_s$ (time/sampling interval), the method of interpolation used in the present invention is defined as a function of $t/T_i$ (time/interpolation interval). This allows the interpolation filtering to be totally independent of the symbol rate in terms of complexity and performance and provides a better rejection of adjacent channels, since the interpolator rejects most of the signal outside the bandwidth of the received channel.

The resampled signal is delivered to the interpolation filter by a numerically controlled oscillator which is controlled by a signal which estimates the ratio of sampling interval/interpolation interval. The interpolants are practically implemented by using a multiplicator-accumulator operator. The output of the timing recovery circuit is supplied to a receive filter and then to a carrier recovery circuit to recover the carrier signal.

BEST MODE FOR CARRYING OUT THE INVENTION

Figure 1:
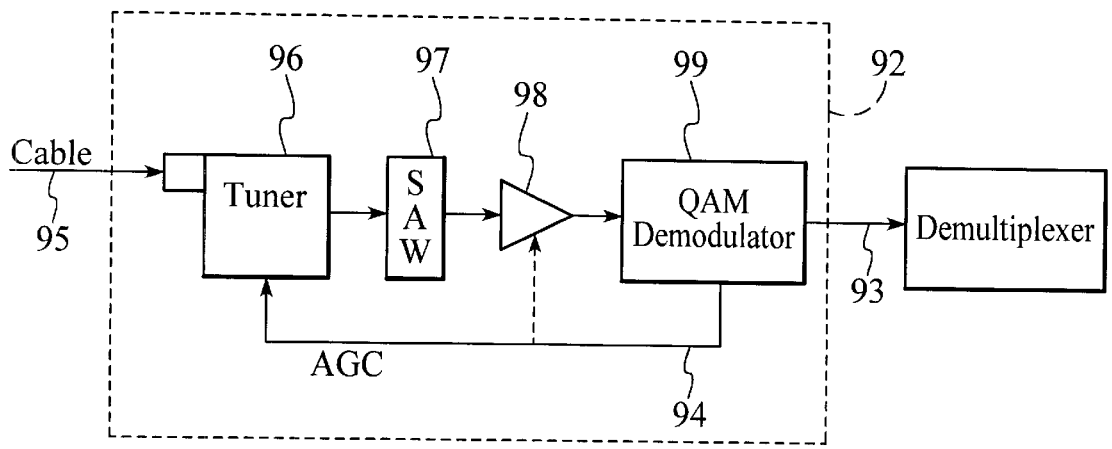
FIG. 1 is a block diagram of a Network Interface Unit in which the demodulator of the present invention may be used.

With reference to FIG. 1, the QAM demodulator 99 of the present invention would typically be used as part of a Network Interface Unit 92. The Network Interface Unit 92 is defined as the interface block between a signal 95 received from a Cable Network and the input signal 93 of a demultiplexer. The signal 95 from the cable network is input into a tuner 96. The tuner accepts frequencies in the range of 47 MHz to 862 MHz at its input and down converts the selected frequency to an intermediate frequency (IF). This IF frequency depends on the channel bandwidth as related to the geographic location. For example, NTSC, USA and JAPAN have a 6 MHz channel with IF around 44 MHz, while PAL/SECAM and EUROPE have an 8 MHz channel with IF around 36 MHz. The output of the tuner is input to a surface acoustic wave (SAW) filter 97, the IF frequency being equal to the SAW filter center frequency. The output of the SAW filter 97 is supplied to an amplifier 98, which is used to compensate for the SAW filter attenuation, and then the output of the amplifier 98 is supplied to the QAM demodulator 99. The amplifier 98 can also have a variable gain controlled by an Automatic Gain Control signal 94 of the QAM demodulator 99. It is also possible for the QAM demodulator 99 to be used in various other digital transmission systems using QAM or QPSK demodulation, such as radio links, wireless local loops, or in-home networks.

Figure 2:
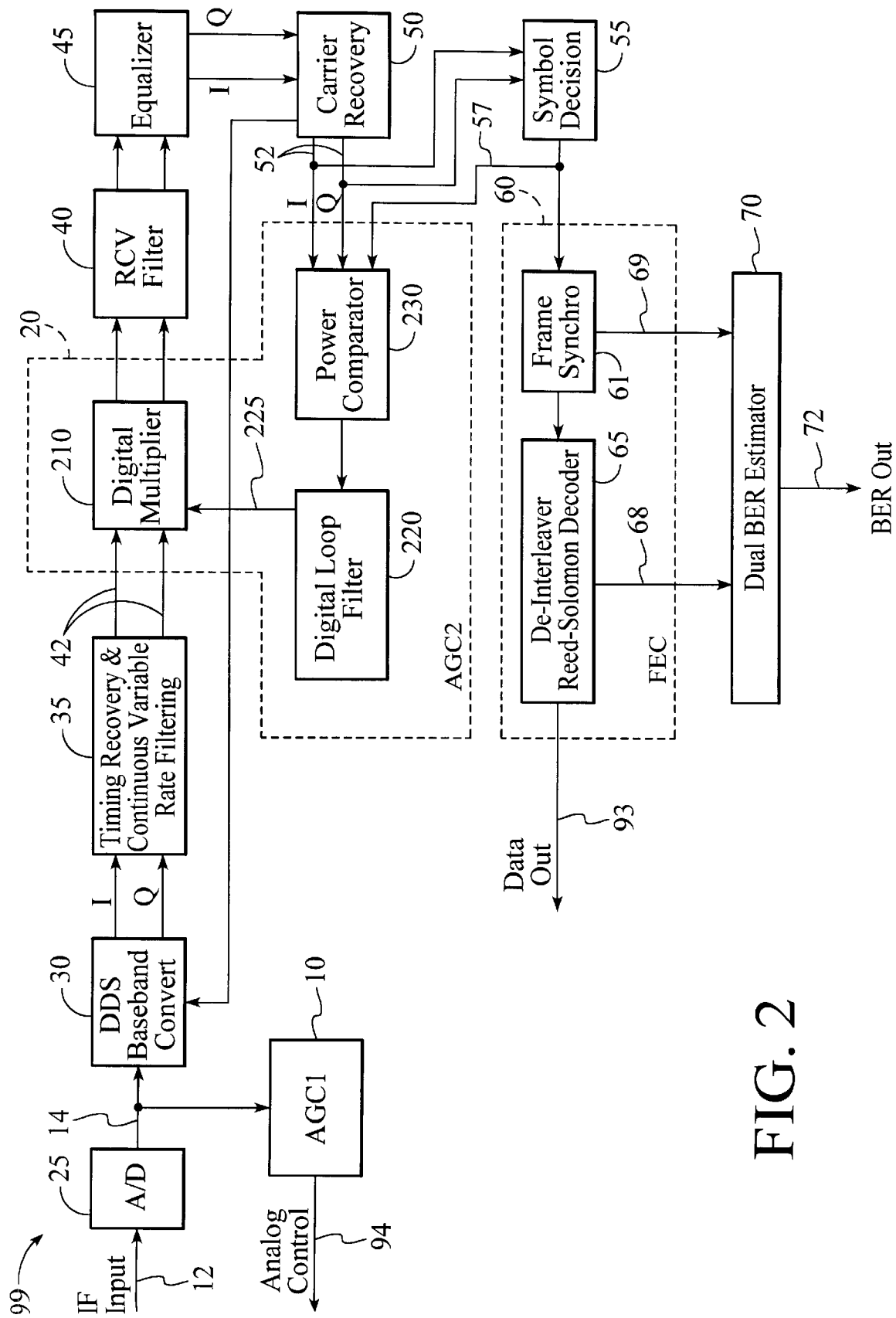
FIG. 2 is a block diagram of the demodulator of the present invention.

Referring to FIG. 2, the QAM demodulator 99 of the present invention includes an analog-to-digital (A/D) converter 25 which receives the IF input signal 12. The A/D converter 25 samples the IF signal 12 and produces a digital spectrum around the center frequency $F_0$ of the IF signal 12. The output signal 14 of the A/D converter 25 is supplied to a baseband conversion circuit that includes a Direct Digital Synthesizer 30 in order to convert the IF signal to a baseband signal. The output signal 14 of the A/D converter 25 is also supplied to the first Automatic Gain Control circuit (AGC1) 10 for controlling the analog gain of the input signal 12 of the A/D converter 25.

After the signal has been converted to a baseband signal having signal components I (inphase) and Q (quadrature), the baseband signal is supplied to a timing recovery circuit 35 which is used to synchronize the timing of the demodulator circuit to the symbols of the incoming signals. The timing recovery circuit 35 uses a continuously variable interpolation filter for sampling the input signal which allows the circuit to recover a very large range of symbol rates, as will be further explained below. The signal is then supplied to a digital multiplier 210 which is part of a second Automatic Gain Control (AGC2) circuit 20. Then, the signal goes through a Receive Filter 40 and then to an Equalizer 45. The AGC2 circuit 20 is a digital AGC circuit and performs a fine adjustment of the signal level at the equalizer 45 input. The digital AGC circuit 20 only takes into account the signal itself, since adjacent channels have been filtered out by the receive filter 40, and thus compensates digitally for the analog AGC1 circuit 10 which may have reduced the input power due to adjacent channels. The receive filter 40 is a squared root raised cosine type which supports roll-off factors from 0.11 to 0.30, which accepts the timing recovery circuit output signal and ensures an out-of-band rejection higher than 43 dB. This significant rejection increases the back off margin of the Network Interface Unit against adjacent channels. The equalizer 45 compensates for different impairments encountered on the network, such as undesired amplitude-frequency or phase-frequency response. Two equalizer structures can be selected, Transversal or Decision feedback with selectable central tap position.

The output signals of the equalizer 45 are supplied to the carrier recovery circuit 50 to recover the carrier signal. The carrier recovery circuit 50 allows the acquisition and tracking of a frequency offset as high as 12 percent of the symbol rate. The frequency offset recovered can be monitored through a I2C interface. This information can be used to readjust the tuner or the demodulator frequency in order to reduce the filtering degradation of the signal, which helps to improve the bit error rate. The output signal 52 of the carrier recovery circuit 50 is supplied to a symbol decision circuit 55 and is also supplied to a Power Comparator Circuit 230 and Digital Loop Filter 220 within the digital AGC2 circuit 20 to provide a gain control signal 225 to the multiplier 210. Within the symbol decision circuit 55, the signal is supplied to a symbol threshold detector, then to a differential decoder, and finally to a DVB or DAVIC de-mapper which produces the recovered bit stream 57 sent to the Forward Error Correction Circuit 60. The output 57 of the symbol decision circuit is also supplied to the Power Comparator Circuit 230.

The Forward Error Correction (FEC) circuit 60 first performs a frame synchronization 61 in which the bit stream is decomposed into packets of 204 bytes at the output. The packets are then supplied to a de-interleaver and Reed-Solomon (RS) decoder 65, where the packets are de-interleaved and then a correction is performed by the RS decoder of a maximum of 8 errors (bytes) per packet. The RS decoder also provides other information regarding the uncorrected packets and the position of the corrected bytes in the packet, if there are any. Two depths can be selected for the interleaver: 12 (DVB/DAVIC) and 17. The depth 17 increases the strength of the system against impulse noise, but assumes that the signal has been interleaved with the same value at the monitor. After RS decoding, the packets are de-scrambled for energy dispersal removal. The data output 93 of the PEC circuit 60 is constituted of the MPEG2 Transport System (TS) packets and is the output of the demodulator 99. Additionally, bit error rate signals 68, 69 are transmitted to a Dual Bit Error Rate Estimator circuit 70 which estimate Low and High Bit Error Rates based on error correction and frame pattern recognition and produces a Bit Error Rate Signal 72.

Figure 3:
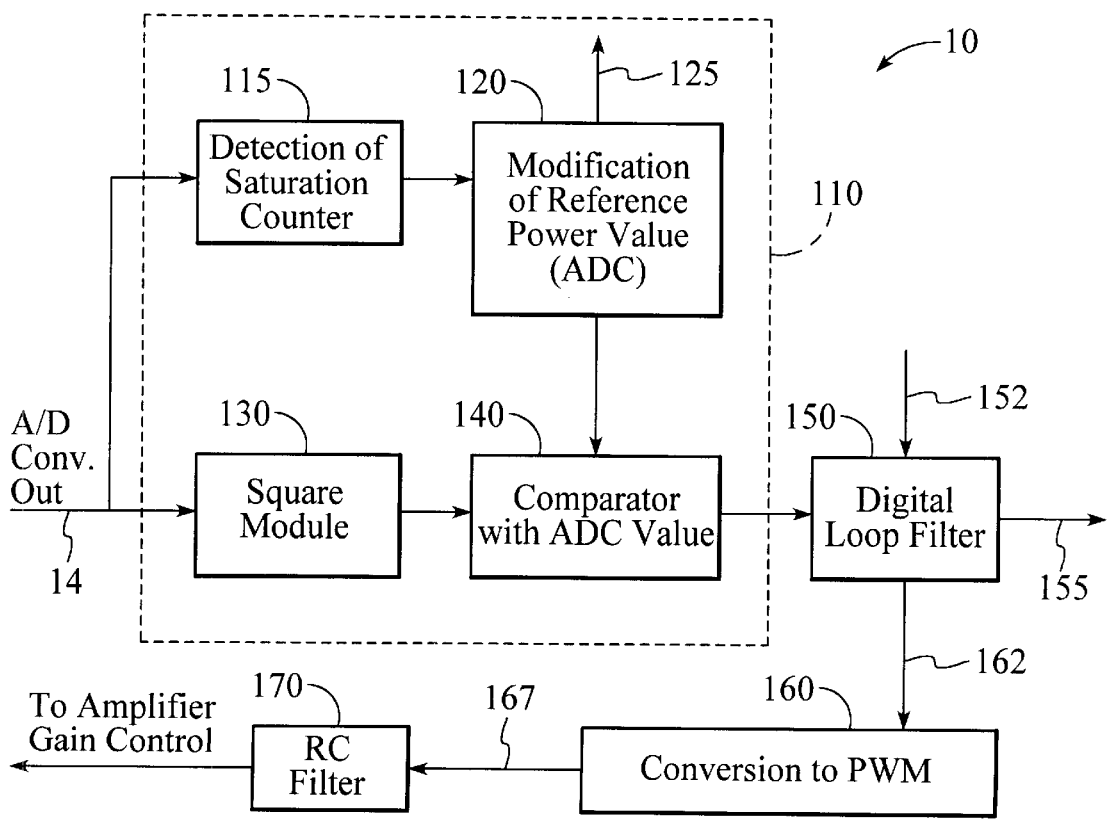
FIG. 3 is a block diagram of the first AGC unit of the demodulator shown in FIG. 2.

As explained above, the dual automatic gain control (AGC) circuits are situated before and after the receive filters to control the received level of the signal. The first AGC circuit 10 controls the analog gain of the input signal of the A/D converter. With reference to FIG. 3, the output signal 14 of the A/D converter 25 is supplied to a power estimation circuit 110 of the AGC1 10 in order to estimate the signal level of the received signal 14 and compare it to a predetermined signal level. The power estimation circuit 110 includes a square module 130 for converting the signal 14 into a square wave to be input into a comparator 140. The comparator 140 compares the input signal with a predetermined reference voltage, or comparator threshold voltage, and produces an output signal when the level of the input signal matches the level of the comparator threshold voltage. The comparator threshold voltage, or reference voltage, can be adapted by a modification circuit 120. The modification circuit 120 monitors the presence of signals from adjacent channels 125 and adapts the reference voltage accordingly. Additionally, a detection of saturation counter 115 detects whether there is any saturation in the A/D converter and, if so, sends a signal to the modification circuit 120 in order to adjust the reference voltage in order to eliminate the saturation. After the signal goes through the comparator 140, the output signal of the power estimator circuit 110 is supplied to a digital loop filter 150 which removes the carrier-frequency components and harmonics from the signal, but passes the original modulating frequencies of the signal. The digital loop filter 150 receives a configuration signal 152 which sets the amplifier maximum gain configuration for limiting non-linearities. The output signal 162 of the digital loop filter 150 is converted to a Pulse Width Modulated (PWM) signal 160 which is supplied to an RC filter 170 which produces a signal 167 that controls the analog gain of the amplifier of the A/D converter. Another output of the digital loop filter provides a signal 155 for monitoring the gain value of the digital loop filter. Since the power estimation is estimated by the digital loop control, the PWM signal that controls the analog gain generates very stable control.

Figure 4:
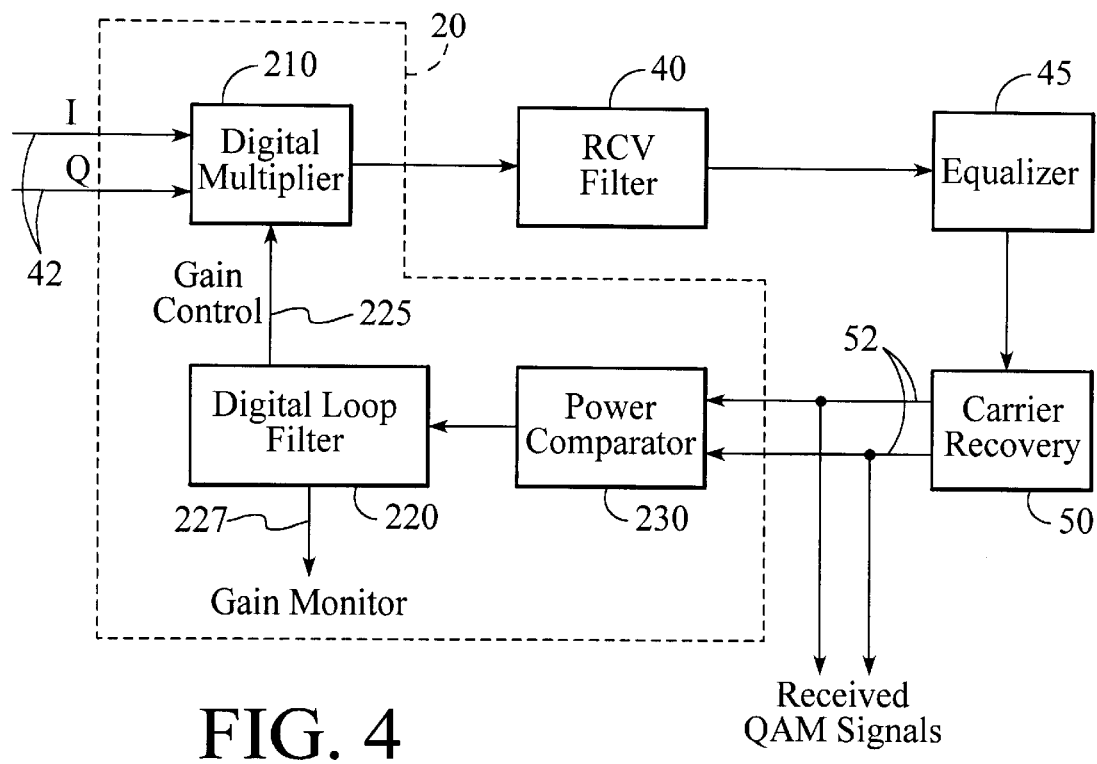
FIG. 4 is a block diagram of the second AGC unit of the demodulator shown in FIG. 2.

The second AGC circuit 20 is situated after the receive filter 40, therefore only having to take into account the received power of the QAM signal itself, and adapts the internal amplification level to the correct level before threshold decision. The second AGC circuit 20 compensates for the attenuation of the first AGC circuit 10, which is caused by the presence of adjacent channels, and also adapts the signal level exactly to the decision threshold levels of the QAM signal. With reference to FIG. 4, the output signal 42 of the timing recovery circuit is supplied to the digital multiplier 210 of the second AGC circuit 20. The digital multiplier 210 multiplies the signal, which is then supplied to the receive filter 40, equalizer 45 and carrier recovery 50 circuits as explained above. The output of the carrier recovery circuit 50 is fed back into a power comparator circuit 230 of the second AGC circuit 20 which compares the output signal 52 from the carrier recovery circuit with a set of QAM values. A digital loop filter 220 filters out any error signals and provides a gain control signal 225 to the digital multiplier 210. Additionally, a signal 227 can be provided from the digital loop filter in order to monitor the amount of gain.

Figure 6:
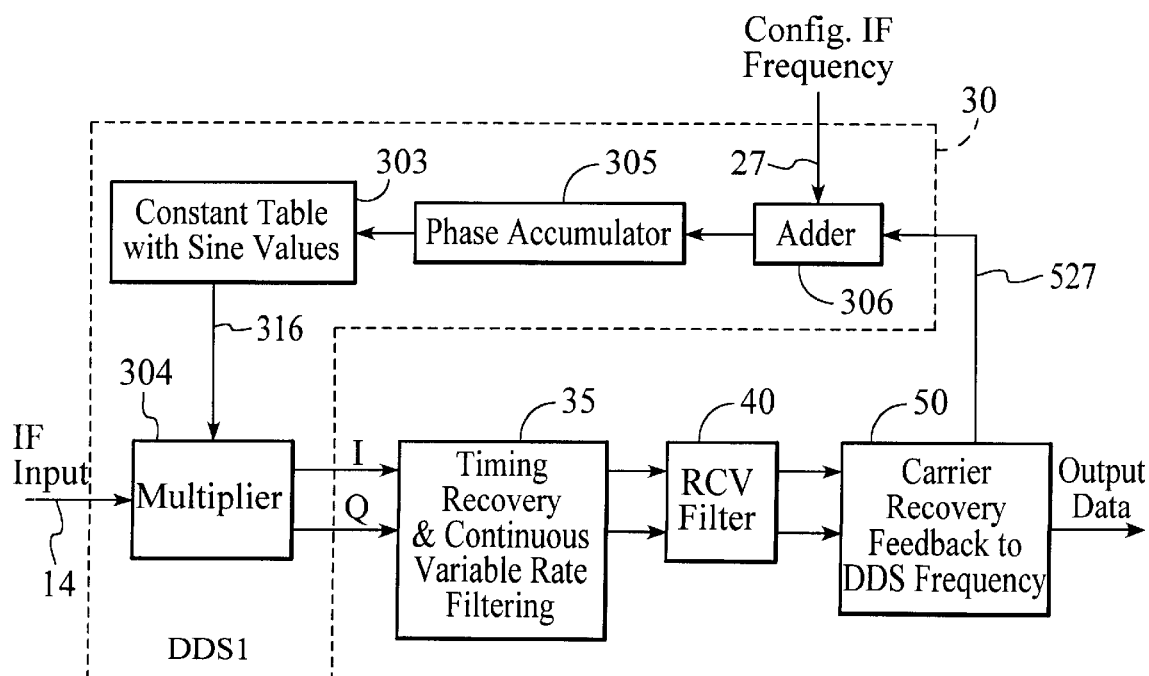
FIG. 6 is a block diagram of the Direct Digital Synthesizer of the demodulator shown in FIG. 2.
Figure 5:
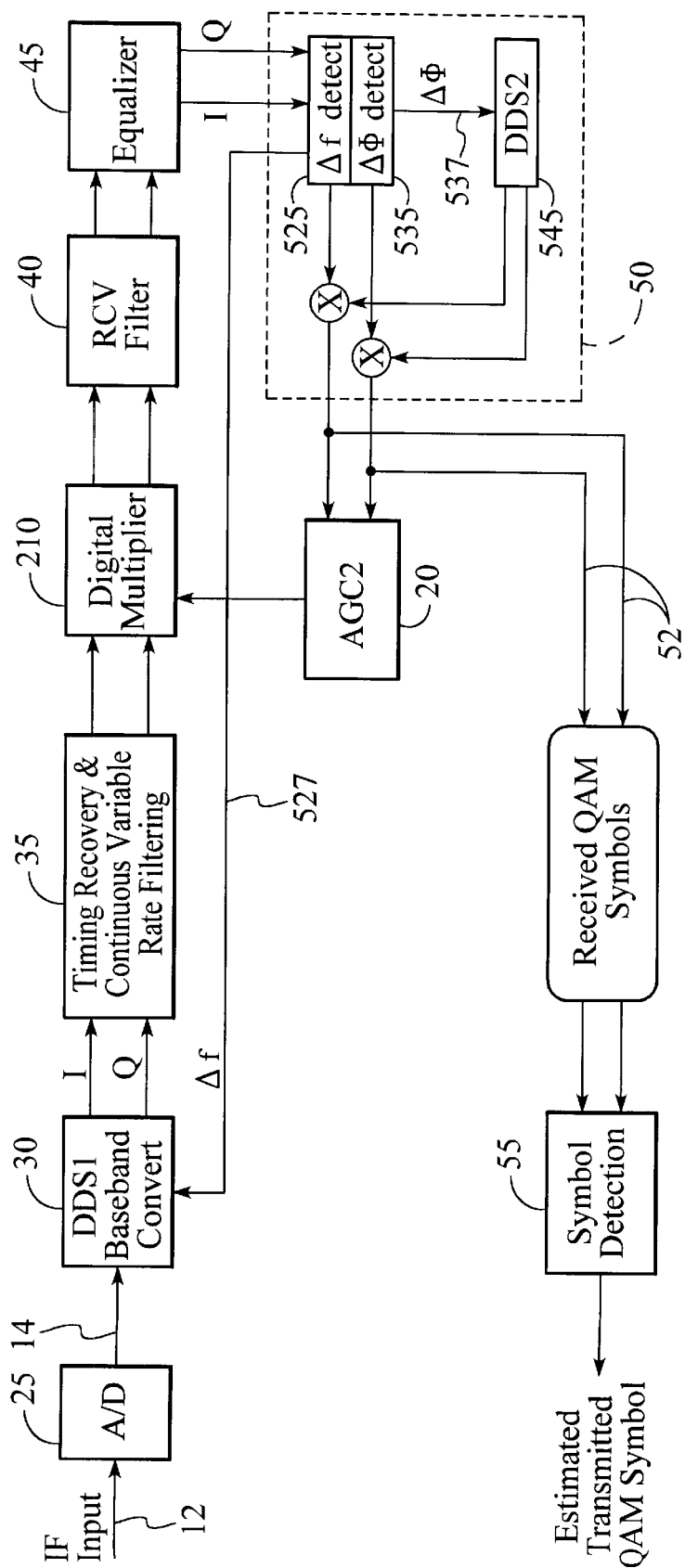
FIG. 5 is a block diagram of a section of the demodulator shown in FIG. 2.

With reference to FIGS. 5 and 6, the aforementioned Direct Digital Synthesizer (DDS) 30 digitally tunes the signal 14 from the A/D converter 25 to be within the bandwidth of the receive filter 40 even in the case of a large frequency offset of the receiver and provides more flexibility in the frequency values used by the input signal. The Intermediate Frequency (IF) to baseband signal conversion is accomplished by using a combination of a first DDS 30 before the receive filter 40 in order to digitally tune the signal within the receive filter bandwidth, and a second DDS 545 within the carrier recovery circuit 50 to fine tune the signal phase after the timing recovery 35 and equalizer 45 circuits.

Referring to FIG. 6, after the IF signal 12 passes through the A/D converter 25, the output digital signal 14 of the A/D converter is supplied to a multiplier 304 that is part of DDS1 30. The multiplier 304 converts the digital signal 14 into two parallel components, I (inphase) and Q (quadrature) which form a QAM symbol. These signal components proceed through the receive filter 40, equalizer 45 and carrier recovery 50 circuits, as explained above. Referring to FIG. 5, the carrier recovery circuit 50 includes a frequency offset detect 525 circuit and a phase offset detect 535 circuit for recovering the carrier signals to be sent to the digital AGC2 circuit 20 and the symbol detection circuit 55. The frequency offset recovered can be monitored through an I2C interface and the information can be used to readjust the tuner frequency in order to reduce the filtering degradation on the signal and thus improve the bit error rate. This information can also be sent as a signal 527 to the DDS1 circuit 30 in order to recover the frequency with complete accuracy before the receive filter 40. The phase detect circuit 535 sends a signal 537 to the DDS2 circuit 545. Employing a dual DDS structure to control the down conversion of the IF signal to a baseband signal is advantageous in that the long loop frequency down-conversion is optimal for frequency recovery since it is done before the receive filter 40 in order to maintain the maximum signal energy before equalization and carrier frequency estimation, while the short loop carrier phase recovery is optimal for phase tracking, especially in case of phase noise on the signal.

Referring to FIG. 6, the carrier recovery frequency feedback signal 527 is supplied to an adder circuit 3.06 within the DDS1 circuit 30. The adder circuit 306 adds the frequency feedback signal 527 to the configured IF frequency 27 and the resulting signal is supplied to a phase accumulation circuit 305 which accumulates frequency elements determined by the frequency feedback signal 527. The signal is supplied to a constant table 303 containing sinusoidal values which synthesizes the signal. The synthesized signal 316 is supplied back into the multiplier 304. Referring back to FIG. 5, the second DDS2 circuit 545 operates in the same manner except that it synthesizes the output signal 537 of the phase detect circuit 535. The purely digital carrier recovery eliminates the need for a voltage controlled oscillator (VCO) to be used and provides a better carrier recovery in terms of accuracy and the residual phase noise of the signal.

Figure 7:
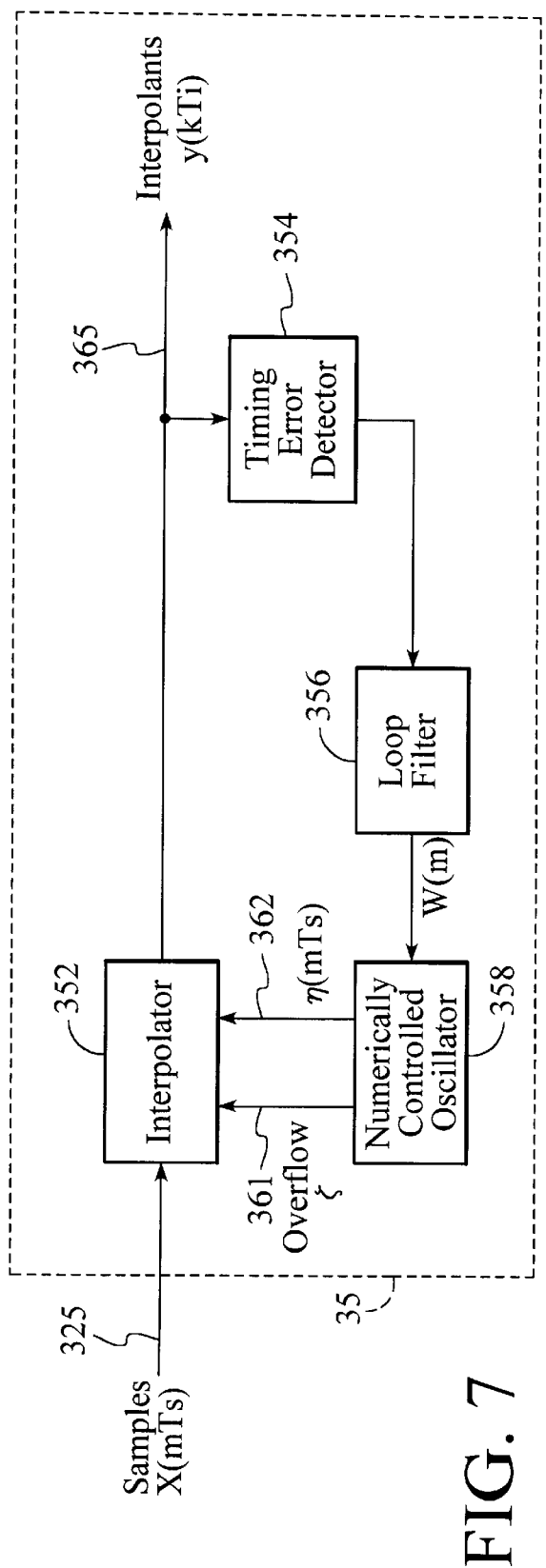
FIG. 7 is a block diagram of the digital timing recovery circuit of the demodulator shown in FIG. 2.

With reference to FIG. 7, the timing recovery circuit 35 uses a symbol rate continuously adaptive interpolation filter 352 for resampling the input signal. As opposed to prior art methods of interpolation which use interpolation functions which are defined as function of $t/T_s$ (time/sampling Interval), the method of interpolation used in the timing recovery circuit 35 is defined as a function of $t/T_i$ (time/Interpolation Interval). This allows the interpolation filtering to be totally independent of the symbol rate in terms of performance and complexity and provides a better rejection of adjacent channels since the interpolator rejects most of the signal outside the bandwidth of the received channel.

The objective of interpolation in modem applications is to process digital samples $x(kT_s)$ 325 produced by an analog to digital converter at rate $1/T_s$, in order to generate "interpolants" $y(kT_i)$ 365 at rate $1/T_i$, with $1/T_i$ multiple of the transmission baud rate $1/T$.

Figure 8:
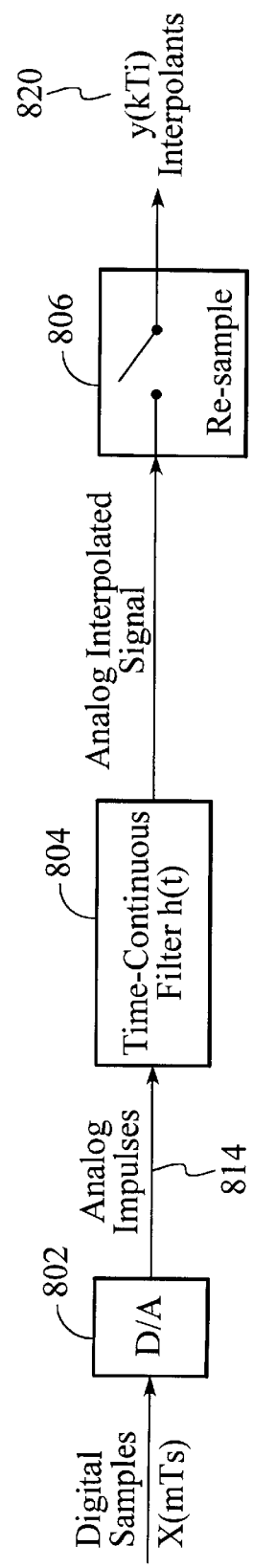
FIG. 8 is a block diagram of a generally known interpolation model.

The following will describe interpolation with a time-continuous filter. The mathematical model is described with reference to FIG. 8. It includes a fictitious digital to analog converter 802 which produces analog impulses 814, followed by a time-continuous filter h(t) 804, and a resampler 806 at time $t=kT_i$. The output interpolants 820 are represented by $$y(kT_i) = \sum_m x(mT_s)h(kT_i - mT_s) \quad (1)$$

Referring back to FIG. 7, the resample—instants $t=kT_i$ are delivered by a numerically controlled oscillator 358. The numerically controlled oscillator 358 produces two signals at each time $mT_s$. The first signal 361 is an overflow signal $\zeta$, which indicates that a resample instant ($t=kT_i$) has occurred during the last $T_s$ period. The second signal 362 is a Ti-fractional signal $\eta$, such that $\eta T_i$ represents the time since the last resample instant.

The numerically controlled oscillator 358 is controlled by a signal W(m) which estimates the ratio $T_s/T_i$. In practical modem applications, W(m) is delivered by a loop filter 356 driven by a phase error estimator or timing error detector 354.

The mathematical description of this can be written with formula:

$\eta(m)=[\eta(m-1)-W(m)]\mod-1$ $\zeta(m)=1$ if $\eta(m-1)-W(m)<0$ \quad (2)

$\zeta(m)=0$ if $\eta(m-1)-W(m)\geq 0$

Prior interpolation methods, which use a filter h(t) normalized by the sampling period $T_s$, introduce a $T_s$ basepoint index and a $T_s$ fractional interval. In the interpolation method used by the present invention, formula (1) above is rewritten with h being a function of a variable $\eta \cdot T_i$. This property of the function h allows the timing and frequency response of the interpolation to be invariant with respect to the interpolants rate, and thus with respect to the baud rate. To achieve this, first note that the sampling instants $mT_s$ can be written as follows:

$mT_s = l_m T_i - \eta(m)T_i$, where $\eta(m)$ is the direct output of the nco and $(l_m-1)$ is the number of overflows ($\zeta=1$) since $t=0$ up to time $t=mT_s$. Introducing the integer interval $I_1$ that contains all m such that $l_m=1$, formula (1) can now be written as follows:

$$y(kT_i) = \sum_1 \left( \sum_{m \in I_1} X(mT_s) \cdot h[(k-l+\eta(m))T_i] \right) \quad (3)$$

Assuming that h(t) is a finite length impulse response over the interval $[I_1 T_i, I_2 T_i]$, formula (3) is rearranged with index $j=k-l$:

$$y(kT_i) = \sum_{j=l_1}^{l_2} a_j[(k-j)T_i] \quad (4)$$

with:

$$a_j(lT_i) = \sum_{m \in I_1} x(mT_s) \cdot h[(j + \eta(m))T_i]$$

The latest formula shows that the interpolants are computed by summing and delaying $(I_1+I_2+1)$ terms $a_j(lT_i)$, where $a_j(lt_i)$ is the accumulation over the time interval $[1-1)T_i, lT_i]$ of the multiplication of input samples $x(mT_s)$ by coefficients $h[(j+\eta(m))T_i]$.

Figure 9:
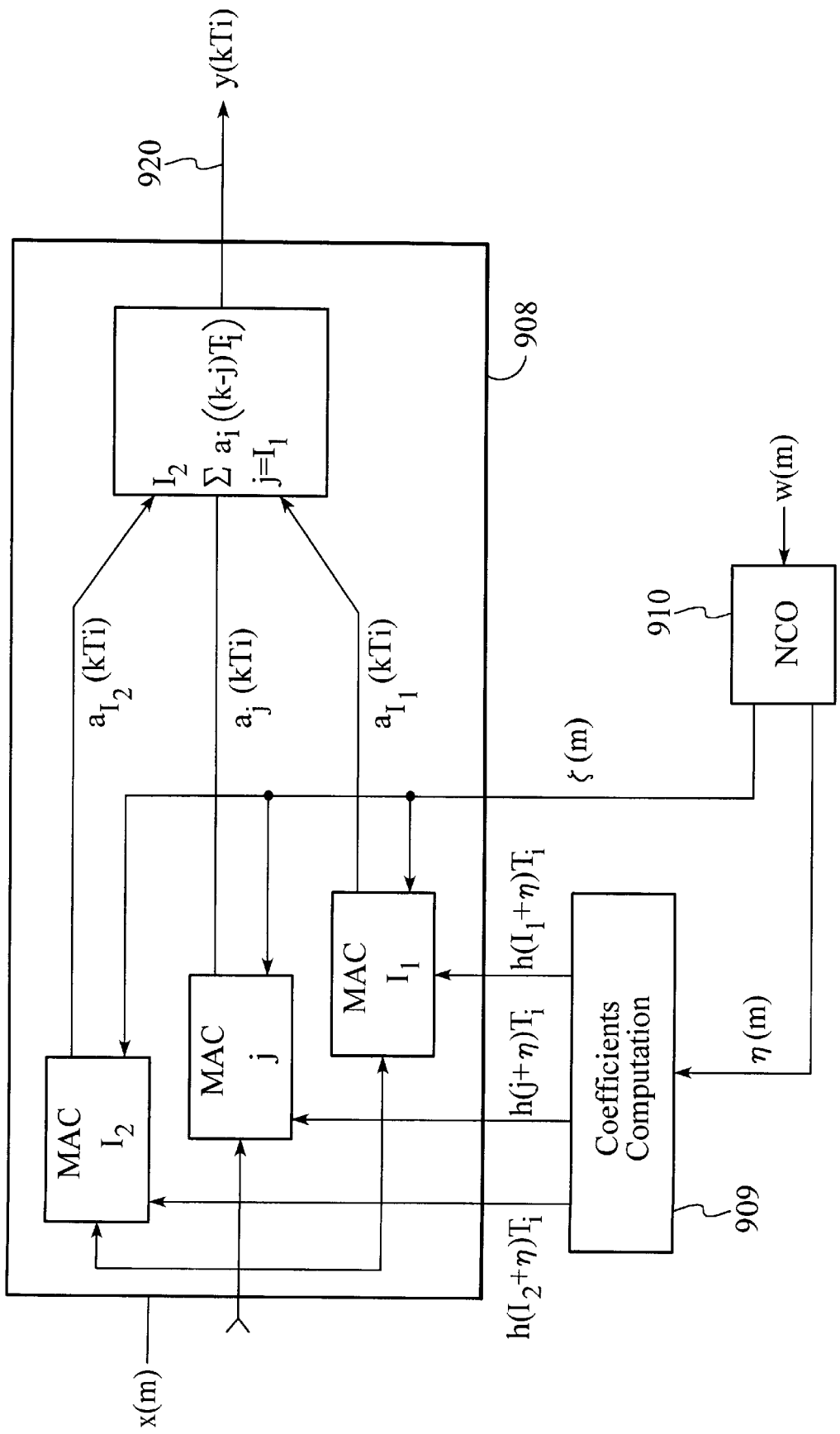
FIG. 9 is a block diagram of an interpolation model used in the digital timing recovery circuit of FIG. 7.

With reference to FIG. 9, aj is practically implemented with a multiplicator-accumulator operator 908 which is reset when the overflow signal $\zeta(m)=1$. A coefficient $h[(j+\eta(m))T_i]$ is delivered by a coefficient-computation block 909 with an input $\eta(m)$ being output by the numerically controlled oscillator (NCO) 910.

It is noted that the multiplier-accumulators operate at frequency $1/T_s$ and that the sum of aj is computed at frequency $1/T_i$. For a low ratio $T_s/T_i$, a high number of multiplication-accumulations are processed during a long $T_i$ period. This allows the $T_i$—interpolator to have a longer time impulse response in regards to $T_s$, and a narrower frequency bandwidth in regards to sampling frequency.

For practical reasons, $h[(j+\eta)T_i]$ may be polynomial function of $\eta$ over the interval $[0,1]$, and $h[(j+\eta)T_i]=p_j(\eta)$. Polynomials of degree 3 have been chosen for a practical implementation because this is of reduced computation complexity and allows very good performances for the impulse response h(t), with only a few intervals $T_i$ (typically 4 to 8). A particular form of the polynomials can also be used to further reduce the computational complexity. Once the degree, form and number $(I_1+I_2+1)$ of polynomials is chosen, the parameters of the polynomials are computed by minimizing a cost function that represents the spectral constraints on the impulse response h(t).

It is also noted that the variable $\eta$, used for computing the coefficient $h[(j+\eta(m))T_i]$, does not need any additional computation and approximation, as is the case for prior art $T_s$—interpolation methods.

Figure 10:
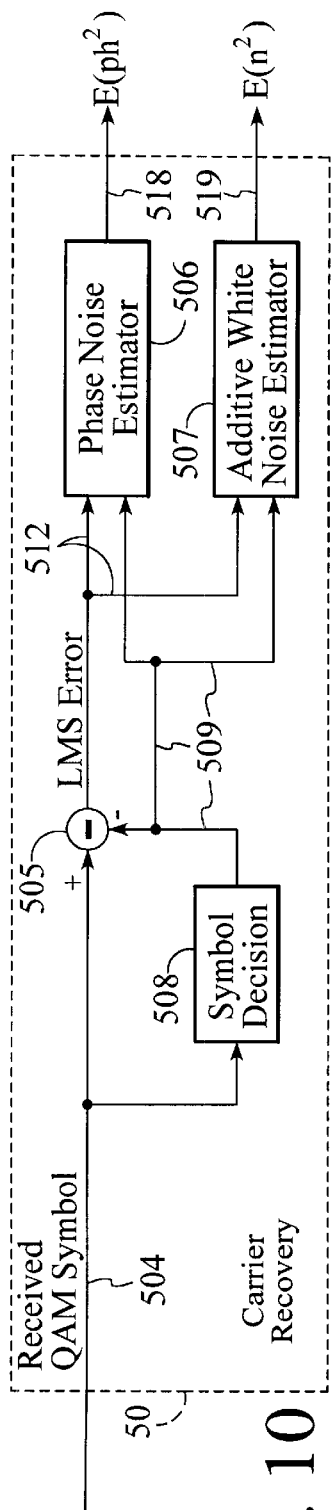
FIG. 10 is a block diagram of a phase noise and additive noise estimator used in the symbol detection circuit of the demodulator of FIG. 2.

With reference to FIG. 10, the previously described carrier recovery circuit 50 includes a phase noise estimation circuit 506 and an additive noise estimation circuit 507 which produces an estimation of the residual phase noise and additive noise viewed by the QAM demodulator. This estimation allows the user to optimize the carrier loop bandwidth in order to reach the best trade off between the phase noise and the additive noise. The received QAM symbol 504 is supplied to a symbol detection or decision block 508. The received QAM symbol 504 is a point in I/Q coordinates which is close in terms of distance to a possible transmitted QAM symbol, but is different because of noise. The symbol detection block 508 decides on the most probable transmitted QAM symbol, by searching for the minimum distance between the received QAM symbol and possible transmitted QAM symbols (threshold symbols). In this way, the symbol detection block 508 determines which QAM symbol was transmitted. The Least Mean Square (LMS) error between the decided QAM symbol 509 and the received QAM symbol 504 is determined by the LMS error method 505 as known in the art and the LMS error signal 512 is supplied with the decided QAM symbol 509 to each of the phase noise 506 and additive noise 507 estimators.

The phase noise estimation is based on the least mean square error (dx+jdy), where dx+jdy=(received point—decided QAM symbol). This error is considered only for QAM symbols having the maximum and same amplitude on I and Q ($|a|+j|a|$). The mean phase noise is then given by $E[dx*dy]=-|a|^2 E(ph^2)$, where E represents the mean and ph is the residual phase noise. The phase noise estimator result 518 does not depend on the additive noise.

The additive noise estimation is based on the same error signal 512 as in the phase noise estimation, but the error in the case of noise estimation is based only on QAM symbols having the minimum amplitude ($|a|=1$) on I and Q. The mean additive noise is given by $E[dx*sgn(I)*I+dy*sgn(Q)*Q)^2]=E[n^2]$, where n denotes the complex additive noise. The additive noise estimator result does not depend on the phase of the signal.

Figure 11:
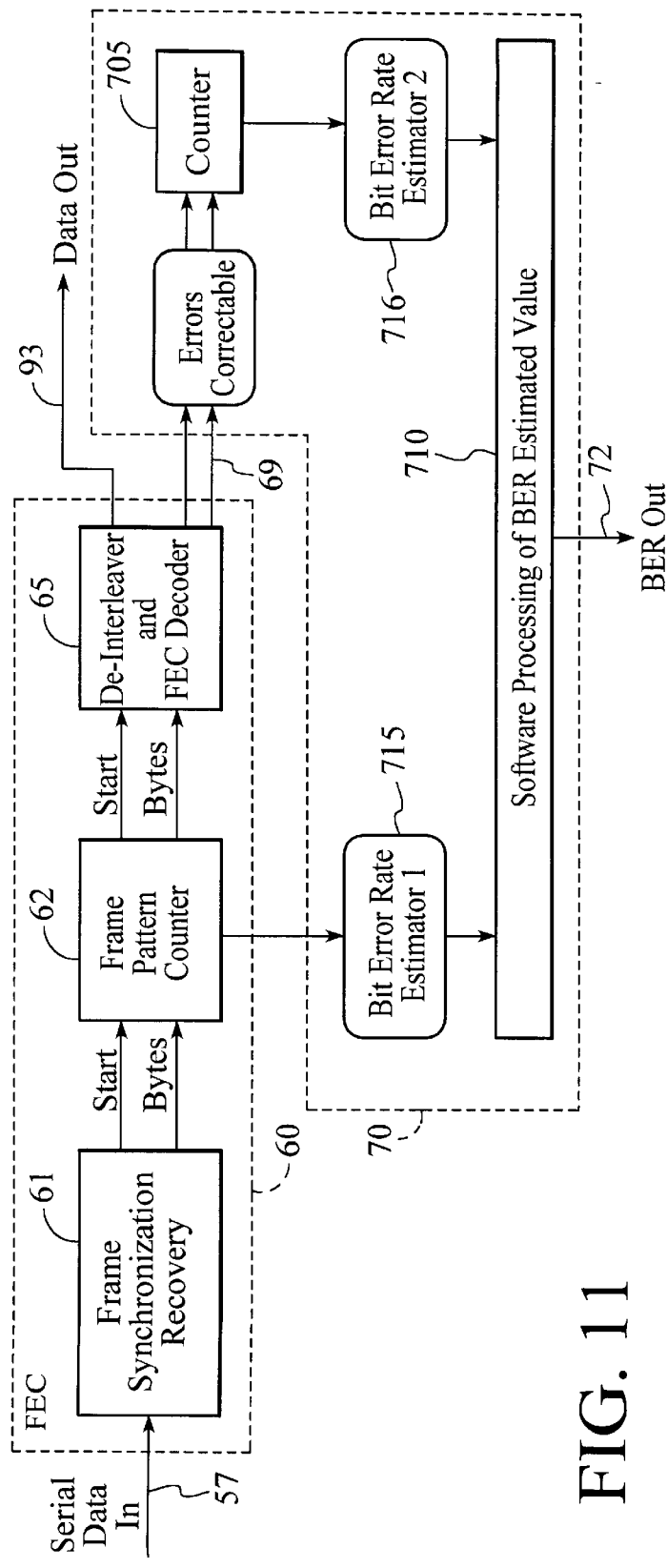
FIG. 11 is a block diagram of the Dual Bit Error Rate estimator used in the demodulator of FIG. 2.

With reference to FIG. 11, the recovered bit stream 57 from the aforementioned symbol detection circuit is supplied to a Frame Synchronization Recovery (FSR) circuit 61 within the Forward Error Correction (FEC) decoder 60. The FSR circuit 61 decomposes the bit stream into packets of 204 bytes at the output. Then, the packets are supplied to a Frame Pattern Counter 62 which maintains a count of recognizable patterns of the frame over a sufficiently large number of frames in order to obtain additional information, such as synchronization patterns, that is not encoded by the FEC encoder. This information is input into a first Bit Error Rate Estimator 715 of the Dual BER unit 70. The bit stream packets then are supplied to the de-interleaver and FEC decoder unit 65 which produces the MPEG TS data output signal 93 in the manner described above. The correctable errors 69 are supplied to a counter 705 within the Dual BER unit 70 and then to a second Bit Error Rate estimator 716. The outputs of the first BER estimator unit 715 and the second BER estimator unit 716 go to a software processing unit 710 which compares the two BER outputs. This gives additional information about the type of noise, such as whether caused by a burst or by a distribution error. For low bit error rates, such as less than $10^{-3}$, the second bit error rate estimator 716 will produce the more accurate value. For high BER, or in the case of burst errors, the second BER estimator 716 is not precise since the correction capacity of the code is exceeded. In this case, the first BER estimator 715 would be more precise.

The Dual Bit Error Rate Estimator circuit allows it to be possible to evaluate the quality of a transmission link even in case of a severely distorted or noisy channel, which can help to identify the cause of bad reception. In particular, the FEC decoder 65 gives a very accurate information when the interleaver strength provides sufficient error spreading to distribute errors uniformly over the frame and below the correction capability of the error correcting code, but very inaccurate information in case of long burst errors.

A comparison between the two types of information provides a way to detect the kind of noise errors which may occur on the network. This allows, for instance, detection of whether a bad reception is due to burst noise or other problems such as phase noise, fading, etc. In some cases of very large burst noise, the FEC decoder may show a relatively low bit error rate although all of the errors may have occurred at a particular instant of transmission, which may have completely altered the information content carried by the transmission link, e.g. TV pictures, audio sound, etc. The Dual BER Estimator circuit makes it easier to determine the cause of the poor transmission and thus solve the problem.

What is claimed is:

1. A quadrature amplitude modulation (QAM) type demodulator comprising:
   an analog-to-digital converter receiving an input signal and producing a first signal,
   a baseband conversion circuit being electrically coupled to the analog-to-digital converter and receiving the first signal and producing a baseband signal,
   a timing recovery circuit being electrically coupled to the baseband conversion circuit and receiving the baseband signal, the timing recovery circuit including an interpolation filter for resampling the input signal, the interpolation filter carrying out an interpolation function that is independent of a symbol rate of the baseband signal and producing a timing recovery output signal, a carrier recovery circuit being electrically coupled to the timing recovery circuit and receiving the timing recovery output signal and producing a QAM signal, and a symbol detection circuit being electrically coupled to the carrier recovery circuit and receiving the QAM signal, whereby an output signal of the symbol detection circuit is a demodulated data output signal.

2. A demodulator, as in claim 1, wherein the interpolation function is defined as a time per interpolation interval function.

3. A demodulator, as in claim 1, wherein the timing recovery circuit includes:

a timing error detector electrically coupled to the interpolation filter and receiving a feedback signal derived from the timing recovery output signal, a loop filter electrically coupled to the timing error detector, and, a numerically controlled oscillator electrically coupled to the loop filter and producing control signals, including an overflow signal and a Ti-fractional signal, which are supplied to the interpolation filter.

4. A demodulator, as a claim 1, wherein the interpolation filter includes a plurality of multiplier-accumulator units for computing interpolants, and wherein the multiplier-accumulator units receive a plurality of input samples, multiply the input samples by a plurality of coefficients and accumulate the multiplied samples over a time interval.

5. A demodulator, as in claim 4, wherein the plurality of coefficients are delivered by a coefficient-computation unit, the coefficient-computation unit being electrically coupled to and receiving the Ti-fractional signal from a numerically controlled oscillator.

6. A demodulator, as in claim 4, wherein an overflow signal is supplied to the multiplier-accumulator units, the multiplier accumulator units being reset when the overflow signal is equal to a predetermined value.

7. A demodulator, as in claim 1, further including a receive filter electrically coupled between the timing recovery circuit and the carrier recovery circuit.

8. A quadrature amplitude modulation (QAM) type demodulator comprising:

an analog-to-digital converter receiving an input signal and producing a first signal, a baseband conversion circuit being electrically coupled to the analog-to-digital converter and receiving the first signal and producing a baseband signal, a timing recovery circuit being electrically coupled to the baseband conversion circuit and receiving the baseband signal, the timing recovery circuit including an interpolation filter for resampling the input signal, the interpolation filter including a plurality of multiplier-accumulator units for computing interpolants and carrying out an interpolation function that is independent of a symbol rate of the baseband signal and producing a timing recovery output signal that is based on interpolated samples of the baseband signal, a carrier recovery circuit being electrically coupled to the timing recovery circuit and receiving the timing recovery circuit output signal and producing a QAM signal, and a symbol detection circuit being electrically coupled to the carrier recovery circuit and receiving the QAM signal, whereby an output signal of the symbol detection circuit is a demodulated data output signal.

9. A demodulator, as in claim 8, wherein the timing recovery circuit includes:

a timing error detector electrically coupled to the interpolation filter and receiving a feedback signal derived from the timing recovery output signal, a loop filter electrically coupled to the timing error detector, and, a numerically controlled oscillator electrically coupled to the loop filter and producing control signals, including an overflow signal and a Ti-fractional signal, which are supplied to the interpolation filter.

10. A demodulator, as a claim 8, wherein the multiplier-accumulator units receive a plurality of input samples, multiply the input samples by a plurality of coefficients and accumulate the multiplied samples over a time interval.

11. A demodulator, as in claim 10, wherein the plurality of coefficients are delivered by a coefficient-computation unit, the coefficient-computation unit being electrically coupled to and receiving the Ti-fractional signal from the numerically controlled oscillator.

12. A demodulator, as in claim 10, wherein an overflow signal is supplied to the multiplier-accumulator units, the multiplier accumulator units being reset when the overflow signal is equal to a predetermined value.

13. A quadrature amplitude modulation (QAM) type demodulator comprising:

an analog-to-digital converter receiving an input signal and producing a first signal, a baseband conversion circuit being electrically coupled to the analog-to-digital converter and receiving the first signal and producing a baseband signal, a timing recovery circuit being electrically coupled to the baseband conversion circuit and receiving the baseband signal and producing a timing recovery output signal that is based on interpolated samples of the baseband signal, the timing recovery circuit including an interpolation filter which carries out an interpolation function that is independent of a symbol rate of the baseband signal, a timing error detector electrically coupled to the interpolation filter and receiving a feedback signal derived from the timing recovery output signal, a loop filter electrically coupled to the timing error detector, and a numerically controlled oscillator electrically coupled to the loop filter and producing a plurality of control signals which are supplied to the interpolation filter, a receive filter electrically coupled to the timing recovery circuit and receiving the timing recovery output signal and producing a receive filter output signal, a carrier recovery circuit being electrically coupled to the receive filter and receiving the receive filter output signal and producing a QAM signal after filtering, and a symbol detection circuit being electrically coupled to the carrier recovery circuit and receiving the QAM signal after filtering, whereby an output signal of the symbol detection circuit is a demodulated data output signal.

14. A demodulator, as in claim 13, wherein the interpolation function is defined as a time per interpolation interval function.

15. A demodulator, as in claim 13, wherein the control signals produced from the numerically controlled oscillator include an overflow signal and a Ti-fractional signal.

16. A demodulator, as a claim 15, wherein the interpolation filter includes a plurality of multiplier-accumulator units for computing interpolants, the multiplier-accumulator units receiving a plurality of input samples, multiplying the input samples by a plurality of coefficients and accumulating the multiplied samples over a time interval.

17. A demodulator, as in claim 16, wherein the plurality of coefficients are delivered by a coefficient-computation unit, the coefficient-computation unit being electrically coupled to and receiving the Ti-fractional signal from the numerically controlled oscillator.

18. A demodulator, as in claim 16, wherein the overflow signal is supplied to the multiplier-accumulator units, the multiplier accumulator units being reset when the overflow signal is equal to a predetermined value.

* * * * *